Jan. 22, 1935.   K. WISSMANN   1,988,862
CONTROL FOR EXCAVATORS
Filed Nov. 11, 1932   2 Sheets-Sheet 1
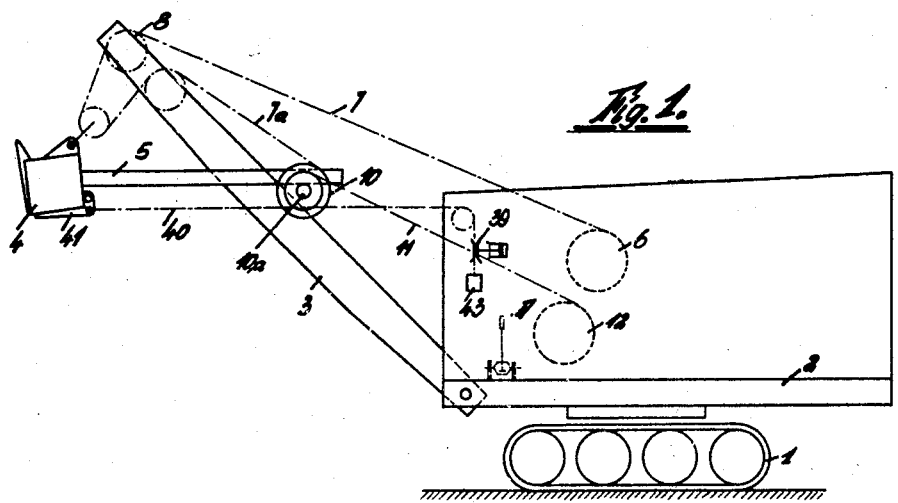
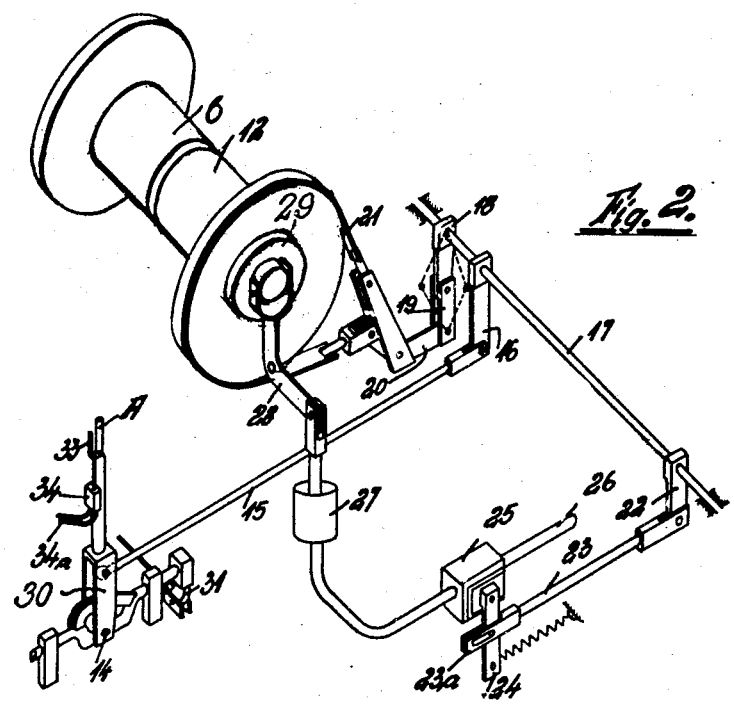
Inventor:
Kurt Wissmann.

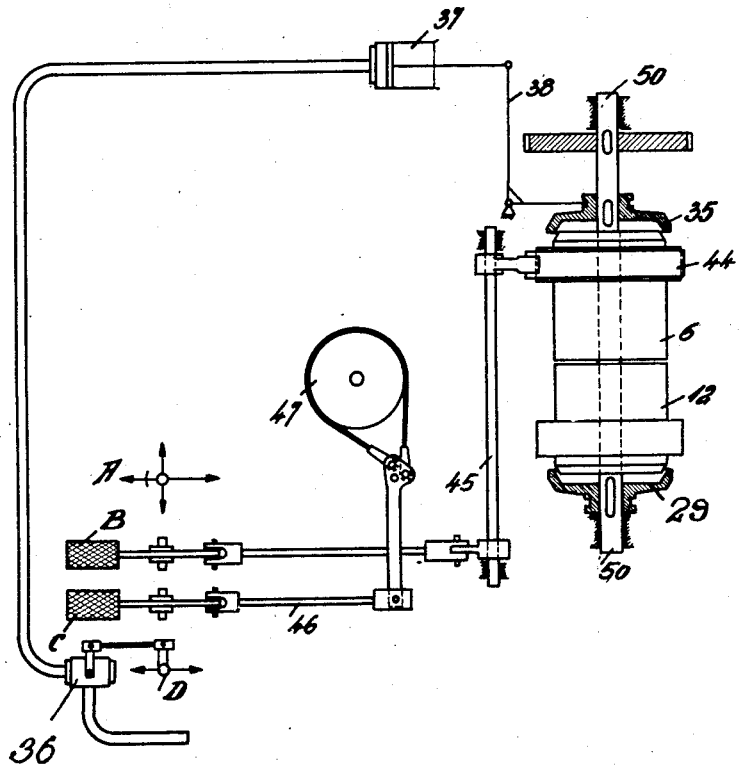

Patented Jan. 22, 1935

1,988,862

UNITED STATES PATENT OFFICE 1,988,862

CONTROL FOR EXCAVATORS

Kurt Wissmann, Muelheim-Ruhr-Speldorf, Germany, assignor to Demag Aktiengesellschaft, Duisburg, Germany Application November 11, 1932, Serial No. 642,211
In Germany November 12, 1931

3 Claims. (Cl. 214—135)

The invention relates to a simplified control for excavators such as shovel excavators, grab excavators, skimmers, draglines and scrapers. Whilst up to the present at least four hand levers were required besides the pedals for carrying out the principal movements of the excavator, thus making it necessary for the driver continually to grip over from one lever to the other, it is now possible with the new type of control to operate without such gripping over from one lever to the other. This is attained by reason of the fact that all the principal movements of the excavator are controlled only by two pedals and two hand levers, at least one of the hand levers revolvable about two axes in angular position to each other. By the expression principal movements is to be understood all the different movements which actually occur in practical work carried out with the excavator, i. e. in the case of the shovel excavator, for instance, the shovel feed, shovel lifting, shovel opening and slewing operations, the principal movements coming into consideration for the other excavator types being hereinafter defined.

The invention is intended specially for excavators, mostly of a smaller type, in which the shovel feed is effected in the known manner by means of the shovel lifting rope and a drum with tail-rope. For such excavators it has also the special advantage that the shovel feeding movement, although effected by means of the lifting rope, is controlled in both directions, i. e. back and forwards, by one single hand lever.

Further ideas pertaining to and involved in the invention are described in the specification. In the accompanying diagrammatic drawings, is illustrated, by way of example, a mechanism according to the invention.

Fig. 1 is a view in elevation of the complete excavator.

Fig. 2 is a perspective view in illustration of one of the double movement levers and the corresponding control organs.

Fig. 3 a plan view of the levers and organs of control.

The excavator shown, by way of example, in Fig. 1 is a shovel excavator. The carriage 2 with jib 3 is slewably mounted on bogie 1 which is mounted on caterpillar bands. The shovel 4 with shovel-arm 5 is carried by the jib. The vertical movement of the shovel is effected by drum 6 and the lifting rope 7 which is led over sheave 8. The return section 7a of rope 7 is coiled up on drum 10 mounted on the shaft of pinion 10a of the shovel-arm operating gear. The drum 10 is of the stepped type, rope 11, which leads to the auxiliary drum 12, being attached to the section of the drum with the smaller diameter. The drums 6 and 12 are mounted, as is shown in Figs. 2 and 3, on one common axle, and are depicted separately in Fig. 1 simply for the sake of clear illustration.

The excavator is controlled in its principal movements by the levers A and D and the pedals B and C (cf. Fig. 3).

*Slewing:*—The lever A (Figure 2) can be turned about the axes of rotation 14 and 30. On being turned about the axis 30 it controls with the aid of lever 31 the drive of the slewing gear, which latter is so well known that it has been omitted from the drawings.

*Shovel feed:*—On being turned about axis 14 the lever A actuates by means of rod 15 the lever 16, and in connection therewith also shaft 17 to which, the lever is fixed. On the latter is located lever 18 which through the medium of the link 19 and the double-arm lever 20 moves one end of the brake 21 of the drum 12 the other end of the brake band being anchored by suitable links to the fulcrum of the lever 20. With the lever A in the middle position lever 18 is at its dead point, so that with each deflection it releases the brake. It will be understood that the double-arm lever 20 has its fulcrum at the angular point and since the lever 18 is at its dead point the connected arm of the lever 20 is in its lowermost position and the brake band is taut. In whichever direction the shaft 17 rotates, therefore, the lever 18 is caused to lift the link 19 and thus to turn the lever 20 in the direction to release the brake band 21.

On shaft 17 is located also lever 22 which, by means of rod 23 provided with a longitudinal slot in its head 23a, controls lever 24 of a pneumatic, hydraulic or steam valve 25. When lever A is laid over in a forward direction only the brake 21 of drum 12 will be released whilst lever 24, due to the longitudinal slot in the rod-head 23a will remain inactive. As drum 12 is released by the brake, drum 10 is able to answer the pull of the lifting rope 7a and consequently pushes the shovel-arm 5 in a forward direction. With deflection of the lever A in the opposite direction not only will the brake 21 be released but also engagement of valve or cock 25 be effected, through the medium of which latter the piping 26 leading from the compressor or the accumulator is connected to the coupling cylinder 27 which in connection with bell crank lever 28 controls the coupling 29 by means of which drum 12 is connected to the driving shaft 50 (cf. Fig. 3). On deflecting lever A in the rearward direction, therefore, the rope 11 is drawn in and the shovel pulled back. Thus the feeding movement which is effected without any special feed mechanism is controlled solely by means of the lever A.

*Shovel discharge:*—Jointed to hand lever A is an additional lever 33 which actuates a valve 34 also attached to lever A and controlling for compressed-air, pressure-water or steam piping 34a. This organ controls a clamp or rope brake 39 (Figure 1) provided for the shovel-flap releasing rope 40, one end of which is fastened to the bottom flap 41 of the shovel and which is kept taut by a weight 43 at the other end. When the additional lever 33 is drawn towards the hand lever A and the latter put over in the forward direction the shovel is moved forwards, whilst the bottom flap or its bolt is held fast by rope 40 through the medium of clamp 39. Thus the bottom flap is opened and the shovel emptied.

*Lifting of shovel:*—The lifting gear is controlled by the hand lever D by connecting drum 6 with the aid of coupling 35 to shaft 50. This shaft may be driven by the motor in any well-known manner. Transmission from lever D to the coupling is effected either by means of a mechanical rod system or by compressed-air or the like controlling valve 36 acting on the piston of a cylinder 37 which by means of the double arm lever 38 throws coupling 35 in and out.

*Lowering of shovel.*—The lowering of the shovel is brought about by releasing the lifting gear brake 44 through the medium of pedal B and the rod and arm system 45, the latter being of well-known construction.

The pedal C controls through rod system 46 the slewing gear brake 47.

The invention may be applied in various modifications, the essential feature being, however, that the principal movements are effected only by two hand levers and two pedals, and that in the case of shovel excavators without feeding mechanism the control of the feed movement is carried out only with one lever. When the control as described is used, for instance, in connection with draglines or scrapers, the lever A controls in the case of the back and forward movements the bucket lifting rope, the additional lever 33 not being necessary, whereas the lever D controls the scraping movement by means of drum 6. All the other controls remain as described.

What is claimed is:

1. In excavators and like machines, comprising a base, a jib carried by said base, an arm mounted on said jib, an excavating tool supported on said arm, means for controlling the effective length of the said arm consisting of a control drum, a flexible element wound upon said drum and operatively connected to the means by which the arm is moved axially in relation to the jib, a driving element for said control drum, the provision of a clutch connecting said driving element with said control drum, a brake applied to said control drum, a brake lever for operating said brake, a crank arm, a link connecting said crank arm with said brake lever, a hand lever operatively connected with said crank arm whereby movement of the hand lever in the forward and rearward directions results in corresponding movements of the crank arm and of the brake lever, means for operating the clutch, and coupling mechanism between the hand lever and the said clutch-operating means, said coupling mechanism being provided for lost motion in one direction of movement of the hand lever, whereby the clutch is operated only on release of the brake in one direction of movement of the hand lever.

2. In excavators and like machines provided according to claim 1, a control shaft mounted for rotation in opposite directions, a link connected to said hand lever for transmitting movement to said control shaft, and a link having provision for lost motion for transmitting movement from said control shaft to the means for operating the clutch, the said links and the crank arm being in relatively fixed positions with respect to the control shaft.

3. In excavators and like machines, comprising a base, a jib carried by said base, an arm mounted on said jib, an excavating tool supported on said arm, means for controlling the effective length of the said arm consisting of a control drum, a flexible element wound upon said drum and operatively connected to the means by which the arm is moved axially in relation to the jib, and a driving element for said control drum, the provision of a clutch connecting said driving element with said control drum, a brake applied to said control drum, a brake lever for operating said brake, a crank arm, a link connecting said crank arm with said brake lever, a hand lever operatively connected with said crank arm whereby movement of the hand lever in the forward and rearward directions results in corresponding movements of the crank arm and of the brake lever, means for operating the clutch consisting of a piston and cylinder, a source of supply of fluid pressure connected to said cylinder, a control valve determining the supply of fluid under pressure to the said cylinder and a control element on the said valve, and coupling mechanism between the hand lever and the control element of the valve, the said coupling mechanism being connected to said valve control element with provision for lost motion, whereby the clutch is operated only on release of the brake in one direction of movement of the hand lever.

KURT WISSMANN.